United States Patent [19]
Tanaka et al.

[11] 3,718,840
[45] Feb. 27, 1973

[54] CURRENT LIMITING ELEMENT

[75] Inventors: Hideo Tanaka, Yasutaka Imajyo, Ikuo Takano, all of Tokyo; Jiro Takahashi, Yokohama; Kazumichi Oka, Tokyo-to, all of Japan

[73] Assignee: Tokyo Shibaaura Electric Company, Ltd., Kawasaki-shi, Japan

[22] Filed: Sept. 23, 1971

[21] Appl. No.: 183,014

[30] Foreign Application Priority Data

Oct. 8, 1970 Japan...................................45/87906

[52] U.S. Cl. ..........................317/99, 323/9, 338/20, 338/214
[51] Int. Cl................................................H02b 1/18
[58] Field of Search ............317/99, 114, 116; 323/9; 338/13, 20, 21, 214

[56] References Cited

UNITED STATES PATENTS

| | | | |
|---|---|---|---|
| 1,364,080 | 1/1921 | Divisson | 338/20 |
| 3,435,401 | 3/1969 | Epstein | 338/13 X |
| 3,205,410 | 9/1965 | Hobson | 317/114 |
| 3,633,075 | 1/1972 | Hawkins | 317/114 |

FOREIGN PATENTS OR APPLICATIONS 351,291   6/1931   Great Britain..........................338/20

OTHER PUBLICATIONS

Resistors, A. P. Howard, "Radio," July 1944, pp. 27–31.

Primary Examiner—Robert K. Schaefer
Assistant Examiner—Gerald P. Tolin
Attorney—Norman F. Oblon et al.

[57] ABSTRACT

A current limiting element is disclosed which includes an electrical conductor consisting of one or more wires formed of a metal having a high temperature coefficient of resistance. The conductor is surrounded by a heat-resistant coating, and the heat-resistant coating is in turn surrounded by an electrically insulating coating. The current limiting element may be coupled between a power source and a circuit breaker to reduce the current delivered to the circuit breaker under overload or short circuit conditions.

15 Claims, 7 Drawing Figures

INVENTORS
HIDEO TANAKA
YASUTAKA IMAJYO
IKUO TAKANO
JIRO TAKAHASHI
KAZUMICHI OKA

BY Oblon, Fisher & Spivak
ATTORNEYS

CURRENT LIMITING ELEMENT

BACKGROUND OF THE INVENTION

1. Field Of The Invention

This invention relates generally to electrical elements for limiting the current passing through equipment, and in particular to a current limiting element for protecting equipment from overload conditions.

2. Description Of The Prior Art

There is a tendency to increase the power rating of centralized control boards of electrical motors, because of the strong demand for increases in the capacity of electrical installations and for an increase in the scale of electrical plants. As a consequence, the short-circuit fault currents that may flow in the power circuits of the centralized control boards, may reach extremely high current values of, say, 50 KA to 100 KA. Circuit breakers capable of protecting against large fault currents of this magnitude tend to be made ever larger in capacity and size in order to provide the necessary breaking capacity.

On the other hand, there is at present a strong demand for smaller sized electrical equipment, and for this purpose current limiting apparatus, such as current limiting reactors, are used. The current limiting apparatus is incorporated in the centralized control boards of the electric motors together with the other electrical control equipment, such as circuit breakers, no-fuse circuit breakers, magnetic switches and thermal relays, and all of these elements must be connected together by connecting wires. The current limiting apparatuses naturally take up space within the board and thus makes the size of the control boards even larger. Also, the connecting wires between the current limiting apparatuses and the other circuit elements in the board become complicated and maintenance and inspection become troublesome. Further, the assembly and wiring of the boards becomes laborious, so that their cost is high.

SUMMARY OF THE INVENTION

Accordingly, one object of this invention is to provide a small-sized, compact current limiting apparatus.

Another object of this invention is to provide a novel combination interconnecting wire and current limiting element.

Yet another object of this invention is to provide a current limiting element that is physically compact and both convenient and inexpensive to install.

Briefly, these and other objects are achieved in accordance with a first aspect of the present invention, by constructing a current limiting element in the form of an electrical conductor including one or more wires of metal having a high temperature coefficient of resistance. A heat-resistant coating surrounds the conductor, and an insulating coating surrounds the heat-resistant coating. The metal of the wire is preferably formed of a Group 8 element, such as iron, nickel and cobalt, or an alloy of a Group 8 element with one or more added elements. The constituents of the wire are chosen to give a structure which has mechanical strength, resistance to heat, and a suitable electrical resistance.

In accordance with a second aspect of the invention, the electrical apparatus may comprise a current limiting element connected between, and protecting, electrical equipment. The element comprises an electrical conductor in the form of one or more wires of a metal which have a high temperature coefficient of resistance, which perform a current-limiting action when a large current passes therethrough, and which have an insulating coating surrounding the conductor.

A third aspect of the invention resides in an electrical apparatus comprising a source of electrical power, a load, a circuit breaker connected to the load, and a current limiting element or elements connected between the power source and the circuit breaker. Each of the current limiting elements comprises an electrical conductor in the form of one or more wires of a metal having a high temperature coefficient of resistance, performing a current limiting action when a large current passes therethrough, and having an insulating coating about their conductive portions. In this way, it becomes unnecessary to have a current limiting element as a special, space-consuming unit in the control board of an electrical motor. Instead, the current limiting element forms one of the conductors between the power source and the circuit breaker.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings, wherein.

DESCRIPTION OF THE PREFERRED EMBODIMENTS

Figure 1:
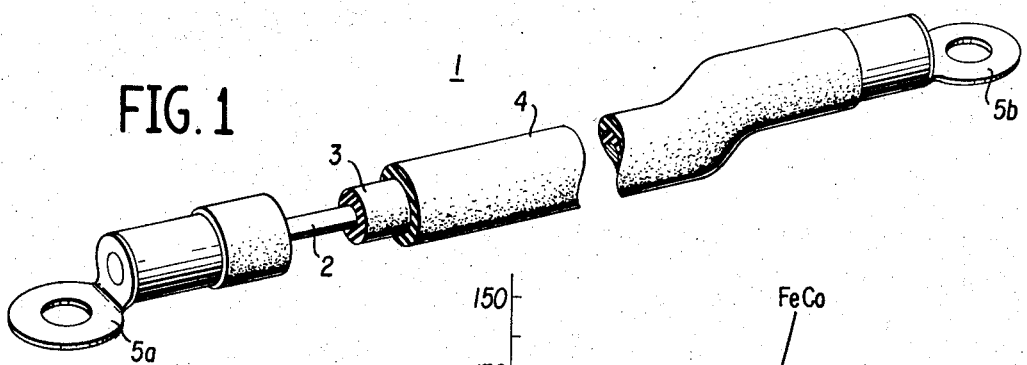
FIG. 1 is a perspective, partially sectional drawing showing a current limiting element in the form of a resistance wire.

Referring now to the drawings, wherein like reference numerals designate identical or corresponding parts throughout the several views, and more particularly to FIG. 1 thereof, a current limiting element 1 is shown in FIG. 1 as formed of a single wire 2 of a current limiting resistant material. That material consists of a Group 8 element alone or with one or more additional elements, but is preferably constituted of iron, iron-cobalt alloy, or tungsten.

Figure 2:
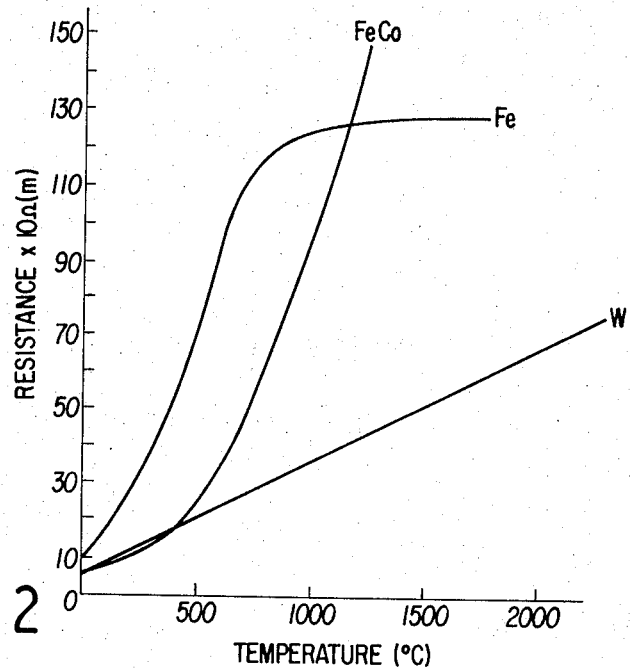
FIG. 2 shows characteristic curves illustrating the variation of specific resistance with temperature of resistance wire made of three different metals.

FIG. 2 shows the variation of specific resistance with variation of temperature from 0°C. and 2,000°C. for the three materials, iron (Fe), iron-cobalt alloy (FeCo), and Tungsten (W). It will be seen that the specific resistance increases to between 10 to 20 times the initial value.

The periphery of the wire 2 is coated with a flexible heat-resistant coating 3, made from a heat-resistant material such as glass fiber or asbestos fiber. The exterior of this heat-resistant coating 3 is coated with electrically insulating coating 4 made of a material which has satisfactory insulating properties, such as synthetic rubber or polytetrafluoroethylene, preferably in the form sold under the trade name TEFLON.

When the current-limiting element is to be incorporated in electrical apparatus, it is cut into specific lengths corresponding to the dimensions between the connected equipment and terminals. Pressure contact terminals such as those illustrated at 5a and 5b are mounted at the ends of the wire.

It will be immediately appreciated that when an overload occurs, the current through the wire 2 increases the temperature of the wire, with the result that its resistance increases markedly, as indicated in FIG. 2. The current supplied through the wire element to the equipment being protected is thereby limited.

Figure 3:
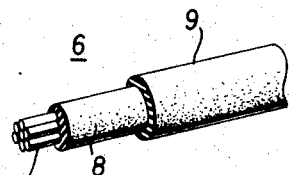
FIG. 3 is a perspective drawing showing another form of current limiting element, again partially in section.

In the current-limiting element 6 of FIG. 3, the conductor 7 is formed of a stranded wire constructed by twisting together a number of solid wires, each consisting of a material similar to that of the conductor 2 and having a high temperature coefficient of resistance. The outside of the conductor 7 is coated with a flexible heat-resistant coating 8 similar to the coating 3 of FIG. 1, and then with a flexible an insulating coating 9 similar to the coating 4 of FIG. 1.

In FIGS. 1 and 3, the exterior of the heat-resistant coating 3, or 8, may be strengthened by an application of silicone varnish.

The following table shows the possible structures of the current-limiting conductor 7 of FIG. 3:

TABLE 1

|  |  | Form of Core | Section Area (mm²) |
|---|---|---|---|
| 1.0 Φ | × | 7-ply | 5.5 |
| 1.2 Φ | × | 7-ply | 8 |
| 1.6 Φ | × | 7-ply | 14 |
| 2.0 Φ | × | 7-ply | 22 |

Figure 4:
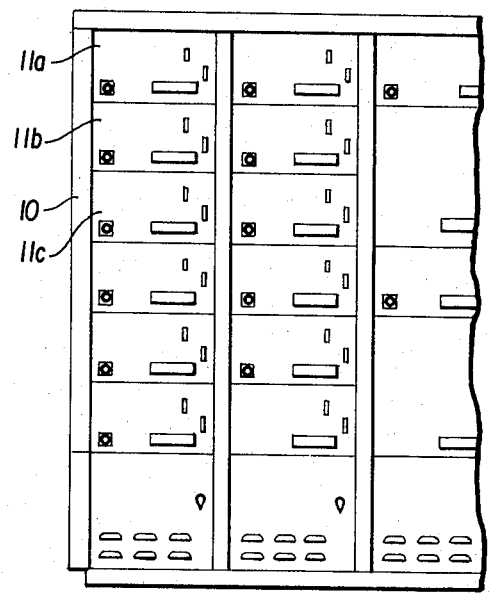
FIG. 4 is a front view of a control board which may be for a motor, for example.

One application of the current-limiting elements will now be described with reference to FIGS. 4 to 6. In FIG. 4 a centralized control board 10 for electrical motors is shown as made up of a number of multi-stage cumulative units 11a, 11b, 11c.... The front of the board 10 is divided into a number of chambers, each accommodating a separate unit. At the rear there are bus-bars connected to a power source. Each of the units 11a, 11b, 11c... is provided with removable and replaceable electrical equipment such as circuit breakers and electromagnetic contactors. These are accommodated in one of the unit-holding chambers.

Figure 5A:
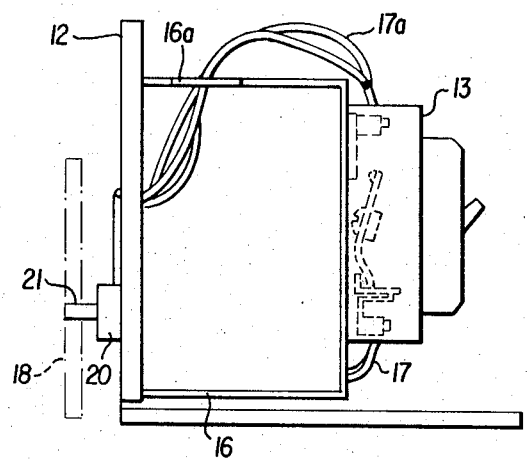
FIGS. 5(a) and 5(b) are side and plan views, respectively, of the apparatus of FIG. 4; and, FIG. 6 is a circuit diagram of one of the units forming the apparatus of FIG. 4.
Figure 5B:
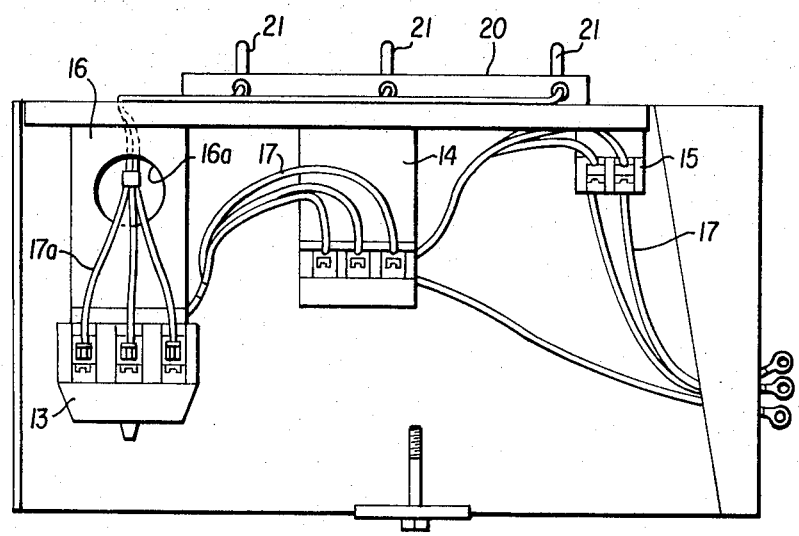
Figure 6:
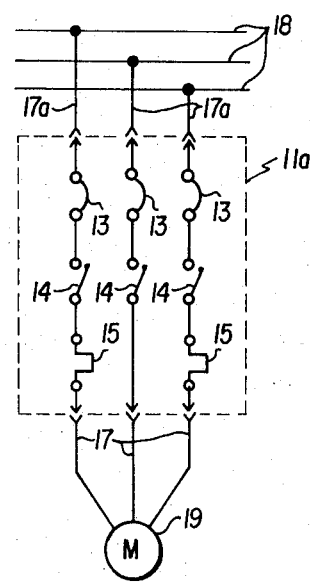

One of the units 11 is shown on a larger scale in FIGS. 5a and 5b and comprises a no-fuse circuit breaker 13, an electromagnetic contactor 14 and a thermal relay 15 mounted in a unit box 12 at specified spacings. The box 12 carries a supporting fixture 16 for the circuit breaker 13. As shown in FIGS. 5 and 6, this protective equipment 13, 14, 15 is connected in series with bus-bars 18 by conductors 17a, and with a load 19, shown as a motor, by conductors 17. The bus-bars 18 are connected to an electrical power source.

The conductors between the bus-bars 18 and the unit 11a are formed as lengths of the current-limiting resistance wires of FIG. 1 or FIG. 3. As shown, the conductors 17a are connected to the power source side of the circuit breaker 13 and extend through a hole 16a in the fixture 16 to the rear of the box 12, where they are connected to contacts 21, which can be connected to the bus-bars 18 and which are surrounded by a moulded insulator 20 extending along the rear face of the box 12. As shown in FIG. 2, the current-limiting resistance conductors used for the conductors 17a have the characteristic that they normally have a low resistance, thus giving an extremely small power loss; but, when a large current flows, for example, on the occurrence of a short circuit, their own Joule heating results in their temperature rising so that they present a high resistance and effectively limit the large current.

It is preferable to connect the current-limiting conductors 17a to the power source side of the circuit breaker 13, rather than to any other part of the electrical apparatus. When a short-circuit fault occurs within the apparatus, or in the load 19 associated with it, the increase in resistance effectively limits the large current with the result that the circuit breaker need have a smaller current capacity than would otherwise be necessary. For example, by connecting the current-limiting resistance conductors to a circuit-breaker having a breaking capacity of only 5 KA, it is feasible to protect a circuit having a short-circuit current of 50 KA. The fact that the current-limiting conductors are connected on the power side of the equipment effectively minimizes the effect on the control equipment 13, 14, 15 and load 19 of surges in the bus-bars and accidents involving those bus-bars.

A further advantage of having the current-limiting conductors connected on the power source side of the control equipment is that the small heat emanating from those conductors due to their small power loss has little effect on the operation of the thermal relay 15, which is mounted remotely from the conductors 17a or is separated from them by the rear of the box 12.

As will be self-evident, the need for separate devices, such as current-limiting reactors, for limiting the current to the load 19 is obviated, the current-limiting elements merely taking the place of the conventional wires connecting the equipment to the bus-bars 18. As a result, the equipment can be made smaller with resulting economies. Moreover, for the reasons already explained, the various control elements 13, 14, 15 can be made smaller as they must deal with smaller maximum currents.

Obviously, numerous modifications and variations of the present invention are possible in light of the above teachings. It is therefore to be understood that within the scope of the appended claims the invention may be practiced otherwise than as specifically described herein.

WHAT IS CLAIMED AS NEW AND DESIRED TO BE SECURED BY LETTERS PATENT OF THE UNITED STATES IS:

1. A current limiting element comprising:
   a cable-like electrical conductor means formed of one or more wires of a metal having a high temperature coefficient of resistance;
   a flexible heat-resistant material surrounding said electrical conductor means; and,
   a flexible insulating material surrounding said flexible heat-resistant material.

2. A current limiting element as in claim 1, wherein: said metal is formed from a Group 8 element.

3. A current limiting element as in claim 2, wherein:
said metal is an alloy containing a Group 8 element and at least one other element.

4. A current limiting element as in claim 3, wherein:
said Group 8 element is iron.

5. A current limiting element as in claim 3, wherein:
said alloy contains iron and cobalt.

6. An electrical apparatus comprising:
a plurality of pieces of electrical equipment,
a current limiting element for protecting said electrical equipment coupled electrically to said pieces of electrical equipment,
said current limiting element comprising an electrical conductor including one or more wires of a metal which has a high temperature coefficient of resistance and which performs a current-limiting action when a large current passes therethrough,
a flexible electrically insulating material surrounding said electrical conductor; and,
a flexible heat-resistant material interposed between said electrical conductor and said flexible electrically insulating material.

7. An electrical apparatus as in claim 6, wherein:
said pieces of electrical equipment comprise a source of electrical power, a load and a circuit breaker coupled to said load; and,
said current limiting element is coupled between said source of electrical power and said circuit breaker.

8. An electrical apparatus as in claim 7, wherein:
said pieces of electrical equipment further comprise a control board,
said control board divided at the front portion thereof into a plurality of unit-holding chambers and carrying at the rear portion thereof bus-bars for connection to said source of electrical power,
at least some of said chambers including circuit breakers and an electromagnetic contactor,
said current limiting element coupled between the power source side of said circuit breaker and terminals for connection to said bus-bars.

9. An electrical apparatus as in claim 6, wherein:
said metal is formed from a Group 8 element.

10. An electrical apparatus as in claim 9, wherein:
said metal is an alloy containing a Group 8 element and at least one other element.

11. An electrical apparatus as in claim 9, wherein:
said Group 8 element is iron.

12. An electrical apparatus as in claim 10, wherein:
said alloy contains iron and cobalt.

13. A current limiting element as in claim 1, wherein:
said flexible heat-resistant material is glass fiber.

14. A current limiting element as in claim 1, wherein:
said flexible heat-resistant material is asbestos fiber.

15. A current limiting element as in claim 1, wherein:
said flexible insulating material is polytetrafluoroethylene.

* * * * *